United States Patent
Lucky et al.

(10) Patent No.: US 6,975,427 B1
(45) Date of Patent: Dec. 13, 2005

(54) METHOD, SYSTEM, AND PROGRAM FOR USING LOOK-UP TABLES TO FILTER RASTER DATA

(75) Inventors: Richard S. Lucky, Louisville, CO (US); Larry M. Ernst, Longmont, CO (US); Danielle Kathyrn Dittrich, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,858

(22) Filed: Mar. 27, 2000

(51) Int. Cl.$^7$ .............................................. G06K 15/00
(52) U.S. Cl. ..................... 358/1.9; 358/3.23; 358/3.16; 358/463
(58) Field of Search ................................ 358/1.9, 3.03, 358/3.23, 3.16, 530, 447, 448, 463, 3.04, 3.11, 3.15, 465, 1.16; 382/266, 217, 210, 261, 260, 262, 263

(56) References Cited

U.S. PATENT DOCUMENTS

| | | | |
|---|---|---|---|
| 4,280,144 A | 7/1981 | Bacon | 358/280 |
| 4,681,424 A | 7/1987 | Kantor et al. | 355/14 R |
| 4,700,199 A | 10/1987 | Horlander | 346/76 PH |
| 4,701,836 A | 10/1987 | Horlander | 346/76 PH |
| 5,128,698 A | 7/1992 | Crawford et al. | 346/160 |
| 5,355,200 A | 10/1994 | Ohba et al. | 355/246 |
| 5,359,423 A | 10/1994 | Loce | 358/296 |
| 5,387,985 A | 2/1995 | Loce et al. | 358/447 |
| 5,390,004 A | 2/1995 | Hopkins | 355/208 |
| 5,480,240 A | 1/1996 | Bolash et al. | 400/124.01 |
| 5,546,170 A | 8/1996 | Ohba et al. | 355/246 |
| 5,548,690 A * | 8/1996 | Shimada | 395/112 |
| 5,583,621 A | 12/1996 | Narukawa | 355/246 |
| 5,586,227 A * | 12/1996 | Kawana | 395/112 |
| 5,646,670 A | 7/1997 | Seto et al. | 347/131 |
| 5,661,564 A | 8/1997 | Tomida et al. | 358/296 |
| 5,668,635 A | 9/1997 | Tomida et al. | 358/296 |
| 5,684,933 A | 11/1997 | Nagafusa | 395/109 |
| 5,696,845 A | 12/1997 | Loce et al. | 382/254 |
| 5,699,172 A | 12/1997 | Hattori et al. | 358/459 |
| 5,724,455 A | 3/1998 | Eschbach | 382/260 |
| 5,751,433 A | 5/1998 | Narendranath et al. | 358/298 |
| 5,751,470 A | 5/1998 | Damon | 358/298 |
| 5,835,233 A | 11/1998 | Otsu et al. | 358/298 |
| 5,876,132 A | 3/1999 | Zable | 400/306 |
| 5,963,244 A | 10/1999 | Mestha et al. | 347/251 |

FOREIGN PATENT DOCUMENTS

| | | | | |
|---|---|---|---|---|
| EP | 0562813 | * | 9/1993 | H04N/1/40 |
| EP | 0858205 | | 8/1998 | H04N/7/00 |
| JP | 7266615 | | 10/1995 | B41J/2/44 |
| JP | 9277500 | | 10/1997 | B41J/2/00 |
| JP | 10166660 | | 6/1998 | B41J/2/52 |
| JP | 11055519 | | 2/1999 | B41J/2/44 |

OTHER PUBLICATIONS

U.S. Appl. No. 09/099,113, entitled "A System , Method, and Program For Saving Toner/Ink in a Color Printer Without Sacrificing Image Quality".

(Continued)

*Primary Examiner*—Jerome Grant, II
(74) *Attorney, Agent, or Firm*—David W. Victor; Konrad Rayne & Victor LLP

(57) ABSTRACT

Disclosed is a method, system, and program for modifying raster pel data according to different types of filtering operations. At least two tables are maintained in memory. At least two of the tables provide output pel values for at least two different types of filtering operations based on input pet values. A plurality of pets are read from raster data for a print job. A determination is made of an entry in one table based on the plurality of read pels to determine at least one output pet value that accomplishes the filtering operation associated with the table. At least two of the tables may be used in the same page of raster data to perform the different filtering operations associated with the at least two tables used within one page. The at least one output pel value is used to generate a pulse to control a printer apparatus.

34 Claims, 4 Drawing Sheets

OTHER PUBLICATIONS

U.S. Appl. No. 09/176,649, entitled "Method and System for Improved Performance of Adjustable Printer Clocks in an Electrophotographic Device", filed Oct. 21, 1998.

M. Takahashi et al., "Full–Color Ink–Jet Printer", Journal Paper, NEC Research and Development, No. 80, pp. 38–41, Jan. 1986 (abstract).

D. McMurtry et al., "Technology of the IBM 3800 Printing Subsystem Model 3", Journal Paper, IBM Journal of Research and Development, vol. 28, No. 3, pp. 257–262, May 1984 (abstract).

R.C. Miller, Jr., "Introduction to the IBM 3800 Printing Subsystem Models 3 and 8", Journal Paper, IBM Journal of Research and Development, vol. 28, No. 3, pp. 252–256, May 1984 (abstract).

Y.L. Yao, "High Resolution Display and Printing Technique", Journal Paper, IBM Technical Disclosure Bulletin, vol. 23, No. 11, pp. 5225–5226 (abstract).

U.S. Appl. No. 09/535,859, filed Mar. 27, 2000.

U.S. Appl. No. 09/535,857, filed Mar. 27, 2000.

M.J. Stanich, "Print–Quality Enhancement in Electrophotographic Printers", IBM J. Res. Develop., vol. 41, No. 6, Nov. 1997, pp. 669–678.

* cited by examiner

METHOD, SYSTEM, AND PROGRAM FOR USING LOOK-UP TABLES TO FILTER RASTER DATA

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System, And Program For Reducing Toner Usage in Print Output", by Larry M. Ernst, Danielle K. Dittrich, and Richard S. Lucky; and "Method, System, And Program For Producing a Look-up Table to Enhance Print Quality", by Danielle K. Dittrich, Larry M. Ernst, and Richard S. Lucky.

BACKGROUND OF THE INVENTION

1. Field of the Invention

The present invention relates to a method, system and program for filtering raster data and, in particular, performing different types of filtering operations on raster data.

2. Description of the Related Art

To print an image, a print engine processor, referred to herein as a raster image processor, converts the image in a page description language or vector graphics format to a bit mapped image indicating a value to print at each pixel of the image. Each bit representing a pixel that is "on" is converted to an electronic pulse. The electronic pulses generated from the raster pel data at which to deposit toner turns the laser beam on to positively charge the surface of a rotating drum, which is an organic photo-conducting cartridge (OPC), that has a coating capable of holding an electrostatic charge. The laser beam turns on and off to beam charges at pixel areas on a scan line across the drum that will ultimately represent the output image. After the laser beam charges all pels on the scan line indicated in the raster data, the drum rotates so the laser beam can place charges on the next scan line. The drum with the electrostatic positive charges then passes over negatively charged toner. The negatively charged toner is then attracted to the positive charged areas of the drum that form the image. The paper, which is negatively charged, passes over the roller drum and attracts the toner as the areas of the roller drum with the toner are positively charged to transfer the toner forming the image from the roller drum to the paper.

Many laser printers may filter the bit map images using a look-up table to alter the pulses generated for each pixel to accomplish a certain filtering result. For instance, filters can be used to provide an economy mode where toner is reduced, remove jagged edges, improve print quality enhancement or reduce the density of images. Typically, the laser printer will gather an area of data and replace either one or all the pulse values for the pixels based on the gathered area of pixel data matching a value in the look-up table. Such look-up tables modify the pixel output by altering the pulse normally used for an "on" pixel value with a pulse width modulator to shorten the pulse width to reduce the electric charge the laser beam places on the roller. Reducing the pulse width reduces the charged are for the pel on the roller and, hence, reduces the amount of toner attracted to the roller for that pel, thus reducing the amount of toner used to represent the pel.

Because different look-up tables may be used to perform different types of filtering, it is possible in prior art systems to change the look-up table being used to filter the rasterized bitmap data. However, in order to change the type of filter being applied, in prior art systems, the printer must halt operations, clear the paper path, skip a page, and then load the new look-up table type, e.g., print quality enhancement, toner reduction, etc., to perform a different type of filtering operation.

There is a need in the art for an improved technique for applying different filtering to rasterized bitmap data to modify the electromagnetic pulses for the bit map pixels that are "on" to accomplish the filtering goal of print quality enhancement, toner reduction, etc.

SUMMARY OF THE PREFERRED EMBODIMENTS

To overcome the limitations in the prior art described above, preferred embodiments disclose a method, system, and program for modifying raster pel data according to different types of filtering operations. Maintaining at least two tables accessible in memory. At least two of the tables provide output pel values for at least two different types of filtering operations based on input pel values. A plurality of pels are read from raster data for a print job. A determination is made of an entry in one table based on the plurality of read pels to determine at least one output pel value that accomplishes the filtering operation associated with the table. At least two of the tables may be used in the same page of raster data to perform the different filtering operations associated with the at least two tables used within one page. The at least one output pel value is used to generate a pulse to control a printer apparatus.

In further embodiments, at least two of the tables may be used to determine output pel values for pels in a same scan line of raster data to perform at least two different types of filtering operations on pels in the same scan line. Alternatively, tables may be switched between pels, i.e., within the pel frequency, to allow different filtering operations between pels without reducing the printer throughput.

In still further embodiments, reading the plurality of pels comprises reading a plurality of pels from different scan lines. In such case, the pels read from memory may include a center pel and surrounding pels on a same and different scan lines, and the output value from the table indicates a pulse width to use for the center pel. Still further, the pels read from memory form a diamond shape such that the center pel is positioned at the center of the diamond shape.

Preferred embodiments provide an improved technique for filtering raster data on a page by allowing different look-up tables (LUTs) utilized for different types of filtering operations to be switched dynamically in the middle of a page. Further, with the preferred embodiments, different LUTs for different types of filtering operations may be applied to pels on the same scan line. This flexibility allows different filters to apply to print data on the same line. For instance, some of the pels on a scan line may be modified by a print quality enhancement filter and other pels may be modified by a toner reduction filter.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
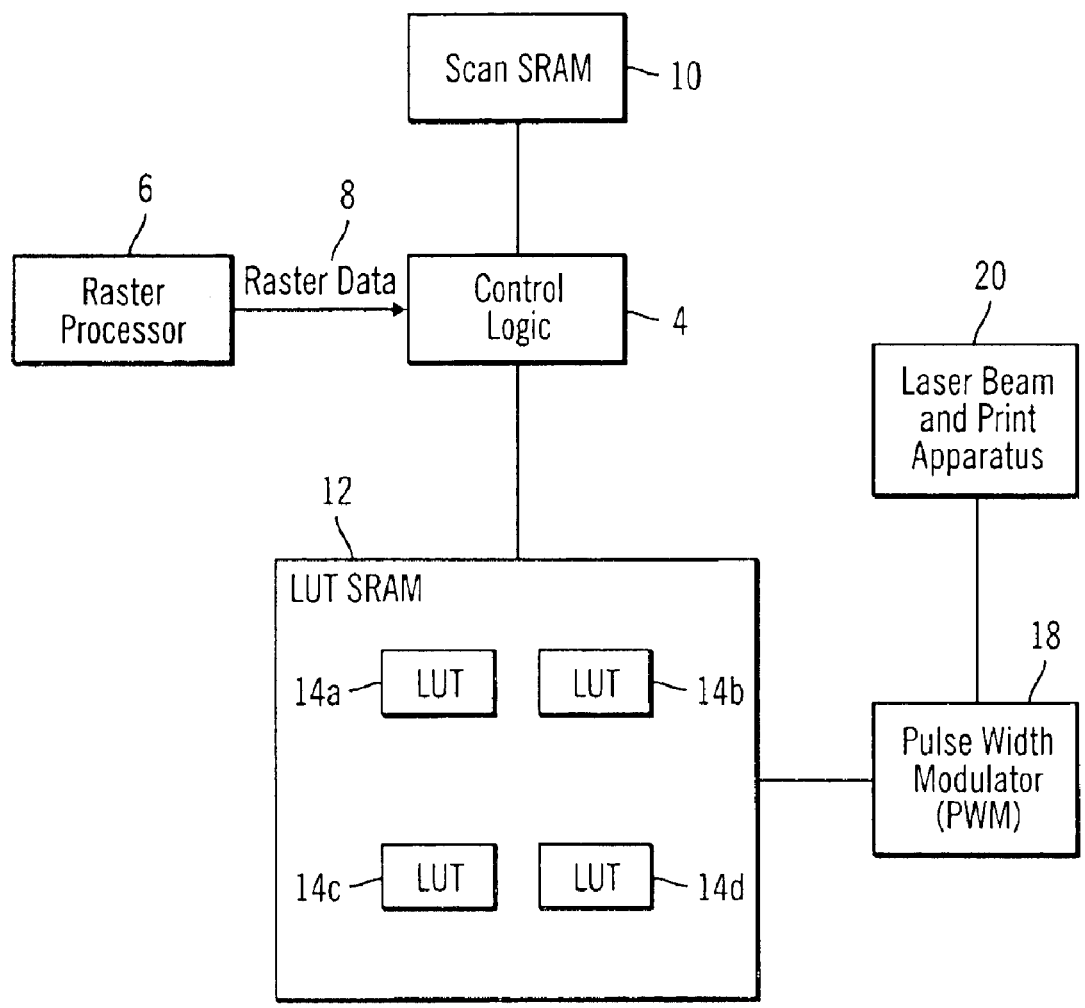
FIG. 1 illustrates a printing computing environment in which preferred embodiments of the present invention are implemented.

FIG. 1 illustrates a printing computing environment in which preferred embodiments are implemented. Control logic 4 comprises a programmable chip, such as a field programmable gate array (FPGA) chip, which includes logic to perform the preferred embodiment pel filtering operations. The raster processor 6 generates raster data 8 from vector graphics or page description language commands. The raster data 8 comprises scan lines of pels, where each pel has an "on" or "off" value and location information of the pel in the scan line. The control logic 4 accesses scan lines of raster data 8 and transfers the pels to a scan static random access memory (SRAM) 10. The control logic 4 will access data from the scan SRAM 10 and compare the accessed pel data with values in one of a selected look-up table (LUT) 14a, b, c, d that were previously loaded in a LUT SRAM 12. The control logic 4 is encoded with logic to compare accessed pel data with the LUT 14a, b, c or d to determine an output value for input pel data.

In the example of FIG. 1, the control logic 4 uses the LUTs 14a, b, c, d to accomplish a particular type of filter operation, e.g., print quality enhancement of text, images or double dot data, or toner reduction. Print quality enhancement may involve edge smoothing, compensating for density, etc.

The LUT tables 14a, b, c, d specify how to modify a pel based on the values of the surrounding pels. A pel is modified by modifying its pulse width. The modified or unmodified pel data, i.e., pulse width, is then transferred directly from one selected LUT 14a, b, c, or d to the pulse width modulator (PWM) 18 to generate an electronic pulse, i.e., voltage, which controls the laser beam 20 to electrically charge the area of the roller corresponding to the pel as part of the printing process. In preferred embodiments, the PWM 18 is capable of generating sixty-four different pulse widths for a pel having a value of "on".

Figure 2:
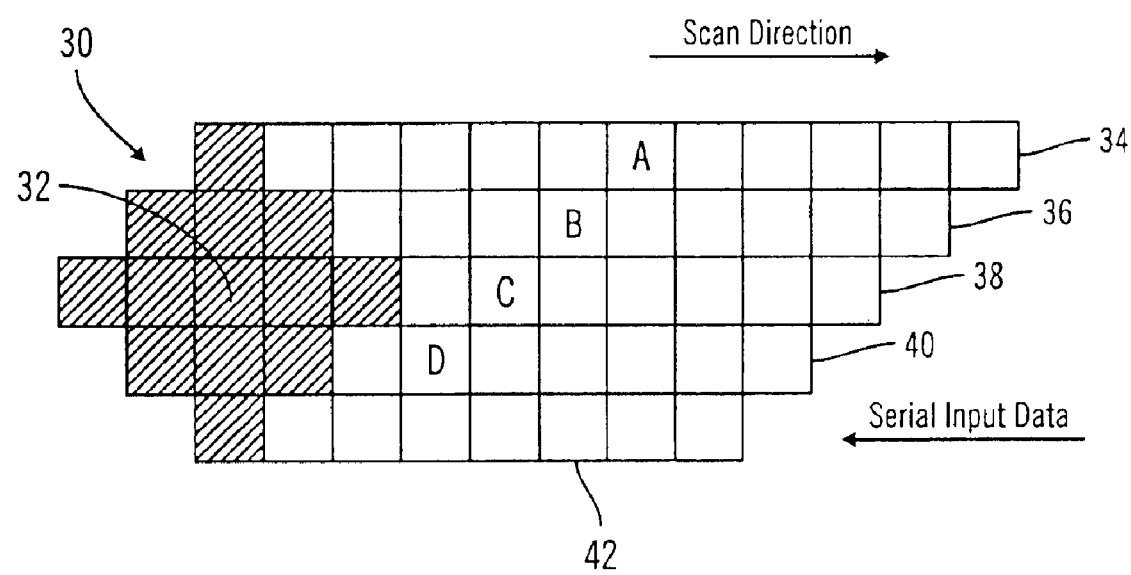
FIG. 2 illustrates a window of pel data accessed for filtering operations in accordance with preferred embodiments of the present invention.

FIG. 2 illustrates how scan line raster data is loaded into the scan SRAM 10 and accessed by the control logic 4. In FIG. 2, each block represents a pel, a white block represents buffered pel data and a darkened block represents one pel the control logic 4 is accessing in a window 30 of pels that will be considered during the filter operation. In preferred embodiments, the control logic 4 accesses a diamond shaped group of adjacent pets 30 from five different scan lines 34, 36, 38, 40, 42 that surround a center pel 32. In preferred embodiments, one or more of the LUTs 14a, b, c or d include an output value for each possible combination of values for the window 30. In the example of FIG. 2, this would require the LUTs 14a, b, c, d to provide $2^{13}$ possible output values as there are $2^{13}$ different possible arrangements of the thirteen pels in the window 30. Thus, the LUTs 14a, b, c, d specify an output value for each unique combination of the pels in the window 30. The output value provides an adjusted pulse width for the center pel 32 in the window 30.

The purpose of the window is to provide an adjusted pulse for the center pel 32 based on the surrounding pels that have the most affect on the center pel 32.

In preferred embodiments, the window 30 is shaped as a diamond to approximate the circular shape of a charge the laser creates on the roller and the shape in which toner is applied to a pel. The toner applied to a pel may extend out in a circular range and affect other pels. Thus, based on the value of the pels surrounding the center pel 32, the LUTs 14a, b, c, d provide an adjusted pulse width value for the center pel 32 to accomplish the purpose of the LUT, e.g., print quality enhancement, toner reduction, etc., in a manner known in the art The co-pending patent application entitled "Method, System, And Program For Reducing Toner Usage in Print Output", and incorporated herein by reference in its entirety describes a LUT for toner reduction and the patent application entitled "Method, System, And Program For Producing a Look-up Table to Enhance Print Quality", and incorporated herein by reference in its entirety above describes a LUT for print quality enhancement.

In preferred embodiments the scan SRAM 10 comprises a 32K×8 SRAM and a set of shift registers. The raster data 8 is delivered in a serial bit stream to the scan SRAM 10, such that eight bits are shifted in and written to the byte wide scan SRAM 10 every eight clocks. The control logic 4 gathers the raster data 8 one bit at a time and writes to the scan SRAM 10 once every eight bits. The pels in the window 30 are read by reading the first four scan lines 34, 36, 38, and 40 one at a time. The bottom scan line 42, which provides one pel to the window 30, is the input scan line being written to the SRAM 10 by the filter logic 14. The window 30 shifts right through the scan lines. After processing all pels in a scan line as the center pel 32, the window 30 would shift down in the transport direction to start including subsequent scan lines in the window 30. In this way, every pel in the bitmap at one point is the center pel 32 in the window 30 that is adjusted based on the values of the surrounding pels in the window. In preferred embodiments, only the original pel values from the raster data 8 are used in each window 30. Thus, after the center pel 32 is adjusted, when that previous center pel becomes a pel surrounding a center pel 32 in the window 30, the original value of that center pel from the raster data 8 is used, and not the adjusted pulse width value.

The preferred embodiment diamond shaped window 30 provides an improved data sampling over current windows used in filtering pels that are typically rectangular or square shaped, because the diamond shape approximates the actual shape of the laser charge imprint. Thus, the pels most affected by the pulse used to produce the center pel 32 are in the circular diamond shaped window 30. Because, in preferred embodiments, the LUTs provide an output value for every possible combination of pets in the window, minimizing the number of pels in the window by using a diamond shaped window as opposed to a rectangular shape, which includes a greater area of pets, makes it feasible for the LUTs 14a, b, c, d to provide one output value for every possible combination of pets in the window 30. Further, the diamond shaped window 30 considers the affect of surrounding pels to the north, south, east, and west of the center pel 32 as would a rectangular shaped window, but excludes four pels that would be included in a rectangular window that have less of an affect on the center pel 32 as they are farther from the center pel 32 than any pels in the diamond shaped window 30 and are generally outside of the circular radius of a charge for a pel.

In preferred embodiments, the control logic 4 may, in the middle of generating pets within a page and/or a scan line, switch the LUT 14*a, b, c, d* to alter the type of filter operation. For instance, this would allow a single scan line to include image data that needs to be generated with high quality that would require the image print quality enhancement LUT as well as content that may be generated in an economy mode using the toner reduction LUT. A toner reduction LUT would tend to reduce the pulse width for each pel, thereby reducing the size of the charged area on the roller exposed to the laser beam and the amount of toner that would gather at the charged area.

To provide information on which print mode to use, e.g, print quality enhancement for image, text or double dot or toner reduction, the raster data 8 may include switching points and a new print mode for a switching point. A switching point would comprise a scan line, i.e., transport position, and pel position within the scan line at which to change the print mode. An additional mode is bypass mode. In bypass mode, the serial data is sent directly to the printer engine without being stored in the scan SRAM 10 and without being filtered using the LUTs 14*a, b, c, d*. Initially, the control logic 4 is in bypass mode until changed as a result of a switching point. Further, upon initialization, all the LUTs 14*a, b, c, d* are loaded into the LUT SRAM 12 from a non-volatile storage location, such as disk or flash memory. In this way, all the LUT tables 14*a, b, c, d* are readily accessible to the control logic 4.

In preferred embodiments, because all the LUT tables 14*a, b, c, d* are accessible from the same high speed memory, they control logic 4 may switch tables within the pel frequency, thereby allowing the control logic 4 to switch LUTs 14*a, b, c, d*, and hence filtering operations, between pels. Further, the control logic 4 may also switch between the end of one page and the beginning of another. In preferred embodiments, the control logic 4 only calibrates the pulse width modulator (PWM) 18 at start-up. No calibrations are performed when switching between LUTs 14*a, b, c, d*, as such switching, in preferred embodiments, occurs within the pel frequency, thereby allowing the control logic 4 to switch LUTs 14*a, b, c, d* between pels without any delays in printing the pels.

Figure 3:
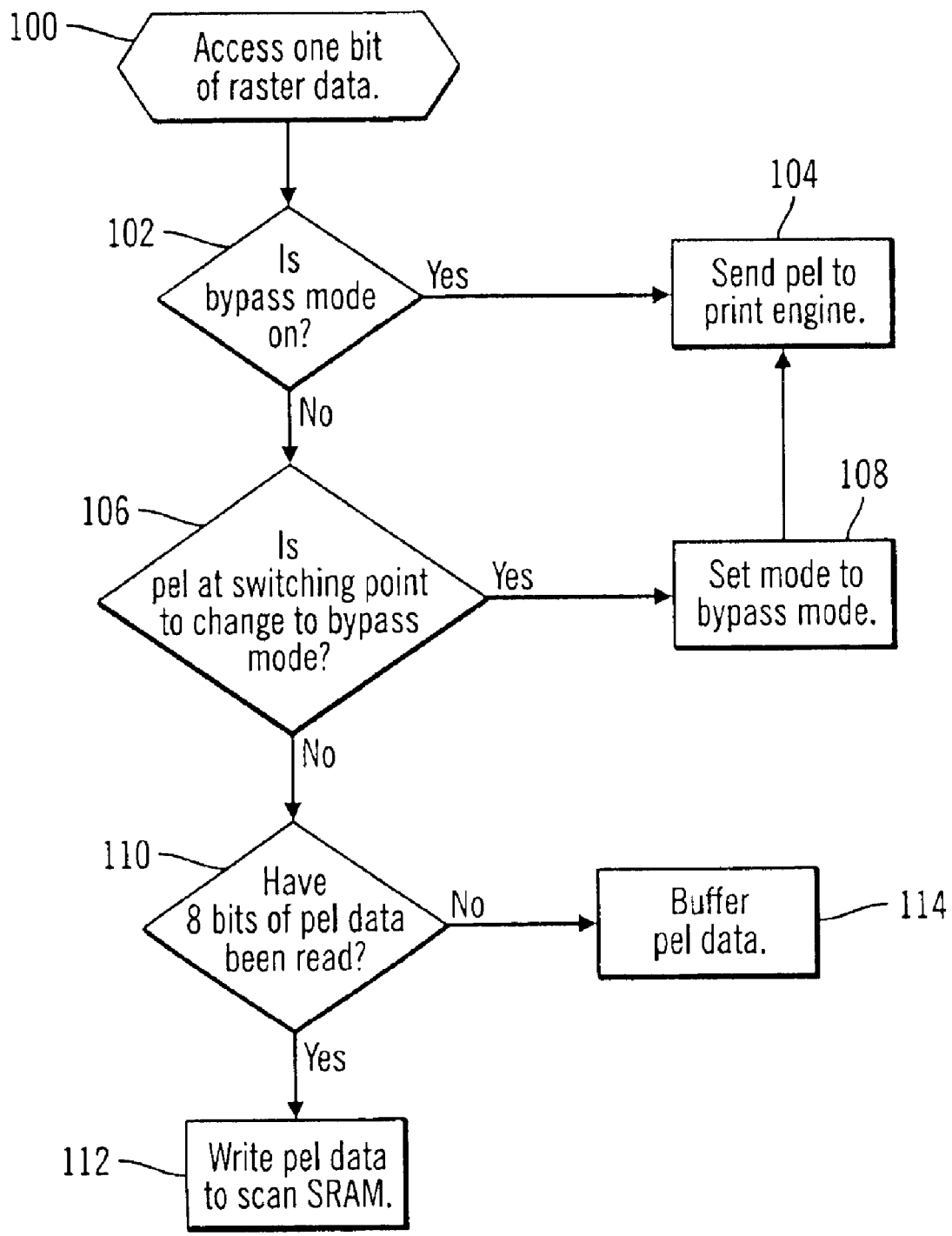
FIGS. 3 and 4 illustrate logic for performing filtering operations on pel data in accordance with preferred embodiments of the present invention.

FIG. 3 illustrates logic implemented in the control logic 4 to access and handle raster data 8 in accordance with the preferred embodiments. In preferred embodiments, the control logic 4 accesses raster data 8 one bit at a time, and begins at block 100 by accessing one bit of raster data 8. If the bypass mode is on (at block 102), then the pet data is sent (at block 104) to the print engine to print at the standard pulse width, i.e., unfiltered, for an "on" pel. Otherwise, if the read pel is at a switch point to change to the bypass mode (at block 106), then the control logic 4 sets (at block 108) the mode to bypass mode and proceeds to block 104 to send the data to the print engine. If the read pel is not at a switch point to change to the bypass mode, then the control logic 4 determines (at block 110) if four pet bits have been read and buffered, including the current read pel bit. If so, then the control logic 4 writes (at block 112) the four pel bits to the scan SRAM 10 for buffering. Otherwise, the pel bit is buffered (at block 114).

Figure 4:
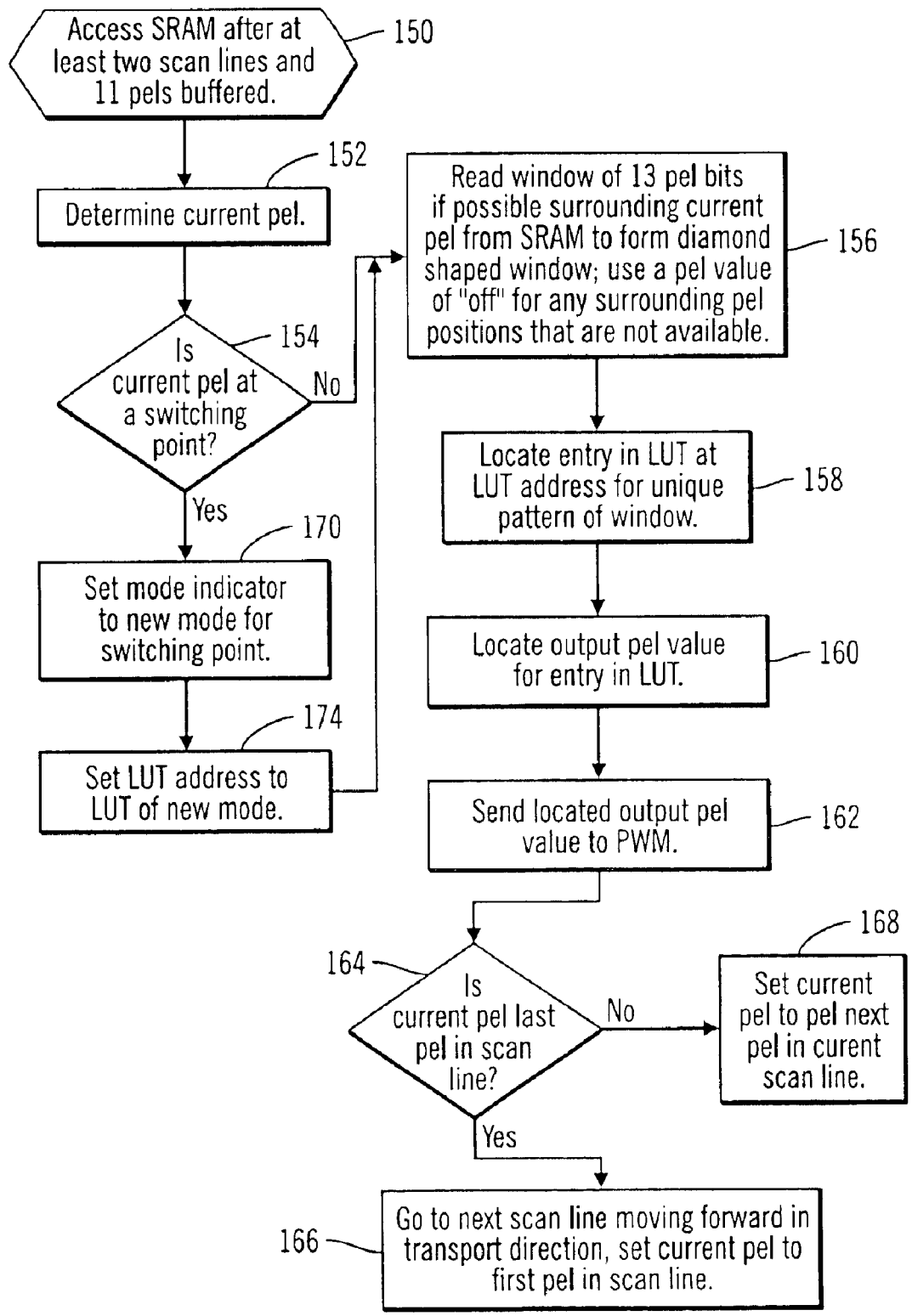

FIG. 4 illustrates logic implemented in the control logic 4 to process and filter pel bits buffered in the scan SRAM 10. Control begins at block 150 with the control logic 4 accessing the scan SRAM 10 to filter pel bits. In preferred embodiments, the control logic 4 accesses the SRAM 10 to filter data after a couple of scan lines and several pets have been written into the scan SRAM 10. The control logic 4 determines (at block 152) the current pet to process in the scan SRAM 10. If the current pet is not at a switching point (at block 154), then the filter logic 14 reads (at block 156) a window 30 of thirteen pels, including the center pet 32, which is the next pel to consider, and twelve pels that surround the current pel 32 in the diamond shaped window 30. If there are no pel bits at certain surrounding bit locations in the window 30, such as the case if the center pet 32 is at the first scan line or last or first positions in the scan line, then a zero pel value is used for such non-existing surrounding pels in the window 30. The control logic 4 then locates (at block 158) the entry in the LUT 14*a, b, c* or *d* indicated in the LUT address, which identifies the current LUT 14*a, b, c* or *d* being used, that matches the unique pet bit pattern of the window 30. The control logic 4 then locates (at block 160) the output value for that entry and sends (at block 162) the located output pet value to the PWM 18 to control the laser beam during the print operation. If the center pet 32 being considered is the last pet in the scan line (at block 164), then the control logic 4 moves forward (at block 166) to the next scan line and sets the current pet to be used as the next center pel 32 to the first pel in the next scan line. Otherwise, the current pet is set (at block 168) to the next pet in the current scan line. This new current pet will become the center pel 32 in the window 30 that is read during the next filter operation in the next instance of the logic beginning at block 150.

If, at block 154, the current pel is at a switching point, then the control logic 4 sets (at block 170) the mode indicator to the new mode for the switching point. The control logic 4 would include logic to perform certain operations for certain of the LUTs 14*a, b, c, d*. The LUT address, which identifies the current LUT table 14*a, b, c,* or *d* to use for the filter operation, is set (at block 174) to the LUT table 14*a, b, c* or *d* for the new mode. In this way, with the preferred logic of FIG. 4, the type of filter operation, e.g., print quality enhancement, toner reduction, etc., can be changed dynamically while pels are being processed.

The logic of FIGS. 3 and 4 is shown as occurring sequentially. However, because in preferred embodiments the logic of FIGS. 3 and 4 is implemented in hardware, certain of the steps shown in FIGS. 3 and 4 may occur concurrently within the hardware.

As discussed, because the control logic 4 may switch LUT 14*a, b, c, d* tables in the same high speed memory within the pel frequency, different filtering operations may be performed for pels within the same scan line. This is advantageous over current techniques, which can only change the filtering operation between pages and that require that the paper path be cleared and a page skipped. For instance, a bar code image requiring high quality may be on the same lines as text, which may only need a relatively lower quality. With the preferred embodiments, switching points may be set within scan lines to allow for one filter operation to be used for the text and the other for the high quality bar code. In this way, an economy mode involving toner reduction can be used for those pels in the scan lines that form the text portion and the print quality enhancement mode can be used for those pels in the scan line that form the bar code.

The preferred embodiments allow the table being used to be switched and accessed immediately as the LUT tables 14*a, b, c, d* for the different modes are buffered in the LUT SRAM 12. With preferred embodiments, the filter mode, and LUT tables being used, may be switched immediately within a scan line, and between pels, without interrupting the printing process.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

In preferred embodiments, there are binary values for each pel. However, in alternative embodiments there may be more than two values for each pel. In such case, the LUTs 14a, b, c, d would have to provide different output values for the multiple possible pel values.

In preferred embodiment, the control logic is implemented as hardware, e.g., a Field Programmable Gate Array (FPGA), Application Specific Integrated Circuit (ASIC), etc. In alternative embodiments, the control logic may be implemented as programmable code in a programmable processor.

In preferred embodiments, there was one LUT 14a, b, c, d for each different type of print mode. In alternative embodiments, there may be multiple LUT tables for the same print mode and, at the same time, different LUT tables for different print modes.

Examples of print modes, such as print quality enhancement and toner reduction were described. However, additional LUTs may be provided for any different type of filtering operation that may be used to modify the pulse width for a pel to alter the appearance of the output and/or reduce the toner used.

In preferred embodiments, there is a LUT SRAM 12 and scan SRAM 10. These SRAMs 10 and 12 may be implemented in the same SRAM chip or dispersed throughout multiple SRAM chips in alternative embodiments, the LUTs 14a, b, c, d may be maintained in a magnetic memory, as opposed to an electronic memory such as an SRAM. Still further, the LUTs 14a, b, c, d may be encoded in hardware logic, such as ASICs, FPGAs, Electronically Erasable Programmable Read-Only-Memory (EEPROM), etc. In alternative embodiments, any type of volatile memory device may be used for the SRAMs 10 and 12. However, in preferred embodiments, the LUTs 14a, b, c, d are all maintained in the same high-speed memory to allow the control logic 4 to switch between LUTs 14a, b, c, d within the pel frequency to maintain printer throughput. In alternative embodiments, the LUTs may be switched at frequencies less or greater than the pel frequency. The LUTs may be programmed using Verilog, which may then be used to generate the hardware.

In preferred embodiments, the window of data considered has a diamond shape. However, different shaped windows of pel data may be used with the preferred embodiment dynamic LUT table technique. Further, more or less pels may be included in the window than the thirteen pel bits describe above.

In preferred embodiments, the LUTs provide a single output pel value for the center pel in the window. In alternative embodiments, the LUT may provide multiple substitute modified pulse values for multiple pels in the window.

In preferred embodiments, the laser printer uses the laser to write or discharge the photoconductor voltage in the areas of the image defined as black (or areas where toner is to be placed). The toner color could be black, magenta, cyan, yellow, or other convenient color. This process is know in the industry as "discharge area development" (DAD), where toner adheres only to areas where the photoconductor is discharged. An alternative embodiment where the charges are the opposite of the DAD system is known in the art as "charge area development" (CAD). The CAD process is used in all electrophotography copiers. With CAD, the laser is used to write or discharge the photoconductor voltage in image areas that are white (or areas where toner is not be placed). Again the toner color could be black, magenta, cyan, yellow, or any other color. Toner adheres only to areas where the photoconductor is charged, which in the CAD process are those areas not impacted by the laser. In the CAD process, the photoconductor latent electrostatic image is the "negative" of the photoconductor latent electrostatic image in the DAD process.

In summary, preferred embodiments disclose a method, system, and program for modifying raster pel data according to different types of filtering operations. At least two tables are maintained in memory. At least two of the tables provide output pel values for at least two different types of filtering operations based on input pel values. A plurality of pels are read from raster data for a print job. A determination is made of an entry in one table based on the plurality of read pels to determine at least one output pel value that accomplishes the filtering operation associated with the table. At least two of the tables may be used in the same page of raster data to perform the different filtering operations associated with the at least two tables used within one page. The at least one output pel value is used to generate a pulse to control a printer apparatus.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for modifying raster pel data according to different types of filtering operations, comprising:

maintaining at least two tables accessible in memory, wherein at least two of the tables provide output pel values for at least two different types of filtering operations based on input pel values;

reading a plurality of pels from raster data for a print job;

determining an entry in one table based on the plurality of read pels to determine at least one output pel value that accomplishes the filtering operation associated with the table, wherein at least two of the tables are capable of being used in one page of raster data to perform the different filtering operations associated with the at least two tables within the page; and using the at least one output pel value to generate a pulse to control a printer apparatus.

2. The method of claim 1, wherein at least two of the tables are capable of being used to determine output pel values for pels in one scan line in the page of raster data to perform at least two different types of filtering operations on pels in the same scan line.

3. The method of claim 1, further comprising:
using a first table to perform a first type of filtering operation on read pels;
determining whether one read pel is at a switch location indicating a point at which to use a second table loaded into the memory to perform a second type of filtering operation; and
using the second table to determine an output value based on the read pels following the indicated point of the switching location until one of the subsequent read pels is at another switching location.

4. The method of claim 1, further comprising:
using a first table to perform filtering operations on read pels;
determining whether one read pel is at a switch location indicating a point at which to use a second table loaded into the memory; and
using the second table to determine an output value based on the read pels following the indicated point of the switching location until one of the subsequent read pels is at another switching location.

5. The method of claim 1, wherein reading the plurality of pels comprises reading a plurality of pels from different scan lines.

6. The method of claim 1, wherein the filtering operations are members of the set of filtering operations comprising enhancing print quality for images, enhancing print quality for text, enhancing print quality for dots, and toner reduction.

7. A method for modifying raster pel data according to different types of filtering operations, comprising:
maintaining at least two tables accessible in memory, wherein at least two of the tables provide output pel values for at least two different types of filtering operations based on input pel values;
reading a plurality of pels from raster data for a print job;
determining an entry in one table based on the plurality of read pels to determine at least one output pel value that accomplishes the filtering operation associated with the table, wherein at least two of the tables are capable of being used to determine output pel values for two adjacent pels in one page to perform at least two different types of filtering operations between the two adjacent pels; and
using the at least one output pel value to generate a pulse to control a printer apparatus.

8. The method of claim 7, wherein the tables may be switched within a pel frequency to allow two different tables to be used between the adjacent pels in a manner that does not reduce the printer apparatus throughput rate.

9. A method for modifying raster pel data according to different types of filtering operations, comprising:
maintaining at least two tables accessible in memory, wherein at least two of the tables provide output pel values for at least two different types of filtering operations based on input pel values;
reading a plurality of pels from memory including a center pel and surrounding pels on one scan line including the center pel and on other scan lines;
determining an entry in one table based on the plurality of read pels to determine at least one output pel value indicating a pulse width to use for the center pel that accomplishes the filtering operation associated with the table, wherein at least two of the tables are capable of being used in one page of raster data to perform the different filtering operations associated with the at least two tables within the page; and
using the at least one output pel value to generate a pulse to control a printer apparatus.

10. The method of claim 9, wherein the pels read form memory form a diamond shape, wherein the center pel is positioned at the center of the diamond shape.

11. A method for modifying raster pel data according to a filtering operation, comprising:
maintaining at least one table accessible in memory, wherein each table provides output pel values for a filtering operation based on input pel values;
reading a plurality of pels that together form a diamond shaped area;
determining an entry in one table based on the plurality of read pels forming the diamond shape to determine at least one output pel value that accomplishes the filtering operation associated with the table; and
using the at least one output pel value to generate a pulse to control a printer apparatus.

12. A system for modifying raster pel data according to different types of filtering operations, comprising:
a printer apparatus;
a memory including at least two tables, wherein at least two of the tables provide output pel values for at least two different types of filtering operations based on input pel values;
means for reading a plurality of pels from raster data for a print job;
means for determining an entry in one table based on the plurality of read pels to determine at least one output pel value that accomplishes the filtering operation associated with the table, wherein at least two of the tables are capable of being used in one page of raster data to perform the different filtering operations associated with the at least two tables within the page; and
means for using the at least one output pel value to generate a pulse to control the printer apparatus.

13. The system of claim 12, further comprising means for using at least two of the tables to determine output pel values for pels in one scan line in the page of raster data to perform at least two different types of filtering operations on pels in the scan line.

14. The system of claim 13, wherein the filtering operations are members of the set of filtering operations comprising enhancing print quality for images, enhancing print quality for text, enhancing print quality for dots, and toner reduction.

15. The system of claim 12, further comprising:
means for using a first table to perform a first type of filtering operation on read pels;
means for determining whether one read pel is at a switch location indicating a point at which to use a second table loaded into the memory to perform a second type of filtering operation; and
means for using the second table to determine an output value based on the read pels following the indicated point of the switching location until one of the subsequent read pels is at another switching location.

16. The system of claim 12, further comprising:
means for using a first table to perform filtering operations on read pels;

means for determining whether one read pel is at a switch location indicating a point at which to use a second table loaded into the memory; and means for using the second table to determine an output value based on the read pels following the indicated point of the switching location until one of the subsequent read pels is at another switching location.

17. The system of claim 12, wherein the means for reading the plurality of pels comprises reading a plurality of pels from different scan lines.

18. A system for modifying raster pel data according to different types of filtering operations, comprising:

a memory including at least two tables, wherein at least two of the tables provide output pel values for at least two different types of filtering operations based on input pel values;

a printer apparatus;

means for reading a plurality of pels from raster data for a print job;

means for determining an entry in one table based on the plurality of read pels to determine at least one output pel value that accomplishes the filtering operation associated with the table, wherein at least two of the tables are capable of being used to determine output pel values for two adjacent pels in one page to perform at least two different types of filtering operations between two adjacent pels; and means for using the at least one output pel value to generate a pulse to control the printer apparatus.

19. The system of claim 18, further comprising means for switching the tables within a pel frequency to allow two different tables to be used between the adjacent pels in a manner that does not reduce the printer apparatus throughput rate.

20. A system for modifying raster pel data according to different types of filtering operations, comprising:

a memory including at least two tables, wherein at least two of the tables provide output pel values for at least two different types of filtering operations based on input pel values;

a printer apparatus;

means for reading a plurality of pels from memory including a center pel and surrounding pels on one scan line including the center pel and on other scan lines;

means for determining an entry in one table based on the plurality of read pels to determine at least one output pel value from the table indicating a pulse width to use for the center pel that accomplishes the filtering operation associated with the table, wherein at least two of the tables are capable of being used in the same page of raster data to perform the different filtering operations associated with the at least two tables used within one page; and means for using the at least one output pel value to generate a pulse to control the printer apparatus.

21. The system of claim 20, wherein the pels read from memory form a diamond shape, wherein the center pel is positioned at the center of the diamond shape.

22. An article of manufacture in communication with a printer apparatus for modifying raster pel data according to different types of filtering operations, wherein the article of manufacture comprises control logic capable of performing the following electronic operations:

maintaining at least two tables accessible in memory, wherein at least two of the tables provide output pel values for at least two different types of filtering operations based on input pel values;

reading a plurality of pels from raster data for a print job;

determining an entry in one table based on the plurality of read pels to determine at least one output pel value that accomplishes the filtering operation associated with the table, wherein at least two of the tables are capable of being used in one page of raster data to perform the different filtering operations associated with the at least two tables used within the page; and using the at least one output pel value to generate a pulse to control the printer apparatus.

23. The article of manufacture of claim 22, wherein at least two of the tables are capable of being used to determine output pel values for pels in one scan line in one page of raster data to perform at least two different types of filtering operations on pels in the scan line.

24. The article of manufacture of claim 22, further comprising:

using a first table to perform a first type of filtering operation on read pels;

determining whether one read pel is at a switch location indicating a point at which to use a second table loaded into the memory to perform a second type of filtering operation; and using the second table to determine an output value based on the read pels following the indicated point of the switching location until one of the subsequent read pels is at another switching location.

25. The article of manufacture of claim 22, further comprising:

using a first table to perform filtering operations on read pels;

determining whether one read pel is at a switch location indicating a point at which to use a second table loaded into the memory; and using the second table to determine an output value based on the read pels following the indicated point of the switching location until one of the subsequent read pels is at another switching location.

26. The article of manufacture of claim 22, wherein reading the plurality of pels comprises reading a plurality of pels from different scan lines.

27. The article of manufacture of claim 22, wherein the filtering operations are members of the set of filtering operations comprising enhancing print quality for images, enhancing print quality for text, enhancing print quality for dots, and toner reduction.

28. The article of manufacture of claim 22, wherein the article of manufacture is implemented in hardware logic or programmable logic to control a processor.

29. An article of manufacture, in communication with a printer apparatus and memory, for modifying raster pel data according to different types of filtering operations, wherein the article of manufacture comprises control logic capable of performing the following electronic operations:

maintaining at least two tables accessible in the memory, wherein at least two of the tables provide output pel values for at least two different types of filtering operations based on input pel values;

reading a plurality of pels from raster data for a print job;

determining an entry in one table based on the plurality of read pels to determine at least one output pel value that accomplishes the filtering operation associated with the table, wherein at least two of the tables are capable of being used to determine output pel values for two adjacent pels in one page to perform at least two different types of filtering operations between the two adjacent pels; and using the at last one output pel value to generate a pulse to control the printer apparatus.

30. The article of manufacture of claim 29, wherein the tables may be switched within a pel frequency to allow two different tables to be used between the adjacent pels in a manner that does not reduce the printer apparatus throughput rate.

31. An article of manufacture, in communication with a printer apparatus and memory, for modifying raster pel data according to different types of filtering operations, wherein the article of manufacture comprises control logic capable of performing the following electronic operations:

maintaining at least two tables accessible in the memory, wherein at least two of the tables provide output pel values for at least two different types of filtering operations based on input pel values;

reading a plurality of pels read from the memory including a center pel and surrounding pels on one scan line including the center pel and on other scan lines;

determining entry in one table based on the plurality of read pels to determine at least one output pel value from the table indicating a pulse width to use for the center pel that accomplishes the filtering operation associated with the table, wherein at least two of the tables are capable of being used in one page of raster data to perform the different filtering operations associated with the at least two tables within the page; and using the at least one output pel value to generate a pulse to control the printer apparatus.

32. The article of manufacture of claim 31, wherein the pels read from memory form a diamond shape, wherein the center pel is positioned at the center of the diamond shape.

33. A system for modifying raster pel data according to a filtering operation, comprising:

a printer apparatus;

a memory including at least one table, wherein each table provides output pel values for a filtering operation based on input pel values;

means for reading a plurality of pels that together form a diamond shaped area;

means for determining an entry in one table based on the plurality of read pels forming the diamond shape to determine at least one output pel value that accomplishes the filtering operation associated with the table; and means for using the at least one output pel value to generate a pulse to control the printer apparatus.

34. An article of manufacture for modifying raster pel data according to a filtering operation, wherein the article of manufacture is in communication with a memory and printer apparatus, and wherein the article of manufacture comprises control logic capable of performing operations comprising:

maintaining at least one table accessible in the memory, wherein each table provides output pel values for a filtering operation based on input pel values;

reading a plurality of pels that together form a diamond shaped area;

determining an entry in one table based on the plurality of read pels forming the diamond shape to determine at least one output pel value that accomplishes the filtering operation associated with the table; and using the at least one output pel value to generate a pulse to control the printer apparatus.

* * * * *

UNITED STATES PATENT AND TRADEMARK OFFICE
CERTIFICATE OF CORRECTION

PATENT NO.         : 6,975,427 B1                                      Page 1 of 1
APPLICATION NO. : 09/535858
DATED              : December 13, 2005
INVENTOR(S)        : Danielle Kathyrn Dittrich et al.

It is certified that error appears in the above-identified patent and that said Letters Patent is hereby corrected as shown below:

<u>Abstract</u>, line 5, delete "input pet" and insert -- input pel -- .
Line 6, delete "of pets" and insert -- of pels -- .
Line 9, delete "pet" and insert -- pel -- .

<u>Column 10</u>, line 8, delete "read form" and insert -- read from -- .

<u>Column 13</u>, line 5, delete "at last" and insert -- at least -- .

<u>Column 13</u>, line 25, delete "determining entry" and insert -- determining an entry" -- .

Signed and Sealed this

Tenth Day of April, 2007

JON W. DUDAS
*Director of the United States Patent and Trademark Office*